United States Patent [19]

Arai et al.

[11] 4,401,489

[45] Aug. 30, 1983

[54] ALUMINUM ALLOY FOILS FOR CATHODES OF ELECTROLYTIC CAPACITORS

[75] Inventors: Kozo Arai; Takao Suzuki; Syozo Umetsu, all of Sakai, Japan

[73] Assignee: Showa Aluminium Kabushiki Kaisha, Sakai, Japan

[21] Appl. No.: 372,928

[22] Filed: Apr. 29, 1982

Related U.S. Application Data

[63] Continuation of Ser. No. 133,616, Mar. 24, 1980, abandoned.

[30] Foreign Application Priority Data

Mar. 27, 1979 [JP] Japan .................................. 54-36608
Mar. 27, 1979 [JP] Japan .................................. 54-36609

[51] Int. Cl.³ .............................................. C22C 21/12
[52] U.S. Cl. .................................................... 148/438
[58] Field of Search ..................... 75/139, 138; 148/32, 148/32.5

[56] References Cited

U.S. PATENT DOCUMENTS

4,164,434  8/1979  Fister, Jr. et al. .................... 75/138

*Primary Examiner*—R. Dean

[57] ABSTRACT

An aluminum alloy foil useful for the cathodes of electrolytic capacitors is prepared from an aluminum alloy comprising 0.03 to 0.5% of copper and 0.002 to 0.05% of titanium.

3 Claims, No Drawings

ALUMINUM ALLOY FOILS FOR CATHODES OF ELECTROLYTIC CAPACITORS

RELATED APPLICATION

This is a continuation of our copending application entitled "Aluminum Alloy Foils for Cathodes of Electrolytic Capacitors," Ser. No. 133,616, filed Mar. 24, 1980, abandoned.

BACKGROUND OF THE INVENTION

This invention relates to aluminum alloy foils useful as cathode foils for electrolytic capacitors comprising an anode foil formed with a dielectric coating and a cathode foil having no dielectric coating and opposed to the anode foil with an electrolyte disposed therebetween.

Throughout the specification and the appended claims, the percentages are all by weight.

Various improvements have been made in anode foils to provide anode foils of greater capacitance and give an increased capacitance to electrolytic capacitors of the type mentioned above, while aluminum foils of low purity, namely about 99.3%, are usually used as cathode foils. However, the cathode foil, like the anode foil, must also have an increased capacitance for the fabrication of electrolytic capacitors with a higher capacitance. Aluminum foils having a purity of 99.5 to 99.8% and aluminum alloy foils prepared from aluminum and some other element, such as magnanese, useful as cathode foils have a greater capacitance than aluminum foils with a low purity of about 99.3%, but these foils still remain to be improved in capacitance.

Cathode foils of increased capacitance are prepared by etching the surface of a foil to form minute cavities therein uniformly with a high density and give an enlarged surface area to the foil. With aluminum foils of about 99.5 to 99.8% in purity, the foil must be etched to excess in order to obtain the desired capacitance. This results in an excessive corrosion weight loss, locally creating pits in the foil, and eventually gives a reduced capacitance and greatly impaired mechanical strength to the foil. Difficulties are also encountered with foils of aluminum-manganese alloy in forming minute cavities uniformly with a high density by etching its surface. When etched excessively, the foil is subject to local pitting, consequently failing to have the desired capacitance.

SUMMARY OF THE INVENTION

This invention provides aluminum alloy cathode foils for electrolytic capacitors, which have a greater capacitance, are less susceptible to corrosion weight losses when etched and possess higher mechanical strength than conventional cathode foils and which are produced by rolling from a cast slab free of cracking.

The aluminum alloy foils of this invention are prepared from an aluminum alloy comprising 0.03 to 0.5% of copper and 0.002 to 0.05% of titanium. The foils are superior to the known cathode foils in the above-mentioned three features, while the slabs for the production of foils can be cast from the aluminum alloy free of cracking.

DESCRIPTION OF THE PREFERRED EMBODIMENTS

The aluminum alloy foils produced from an aluminum alloy comprising 0.03 to 0.5% of copper and 0.002 to 0.05% of titanium according to this invention and useful as cathode foils for electrolytic capacitors have a high capacitance, are not prone to excessive corrosion weight loss when etched and possess high mechanical strength. For the production of the foils, slabs can be cast from the aluminum alloy without involving cracking. Copper is potentially nobler than aluminum and has a wide range of solid solubilities in aluminum, so that when a copper-containing aluminum foil is etched, minute cavities can be formed in the surface of the foil uniformly with a high density, consequently affording an enlarged surface area and an increased capacitance to the foil. When contained in an amount of less than 0.03%, copper nevertheless fails to give an increased capacitance to the foil, whereas when containing more than 0.5% of copper, the foil is subject to excessive etching which entails an excessive corrosion weight loss. Accordingly the copper content should be in the range of from 0.03 to 0.5%, preferably 0.1 to 0.3%. However, when an aluminum alloy with a copper content of more than 0.03% is cast into a slab, cracks could develop in the slab. Titanium serves to prevent such cracking when used in an amount of at least 0.002%. Since presence of more than 0.05% of titanium impairs the capacitance of the aluminum alloy foil, the titanium content shoud be in the range of 0.002 to 0.05%, more preferably 0.005 to 0.1%. Titanium also serves to impart enhanced strength to the aluminum alloy foil. Use of titanium in an amount of 0.002 to 0.05% gives improved mechanical strength to the aluminum alloy foil without resulting in a reduced capacitance.

When incorporating beryllium, aluminum alloy foils comprising 0.03 to 0.5% of copper and 0.002 to 0.05% of titanium will have a greatly increased capacitance because beryllium, which has low solid solubility in aluminum, is in the form of fine particles in aluminum, such that when the beryllium-containing aluminum alloy foil is etched, fine cavities will be formed in the surface of the foil uniformly with a high density, giving an enlarged surface area to the foil. With less than 0.001% of beryllium present, however, the foil will not have an increased capacitance, whereas presence of more than 0.2% of beryllium will lead to an excessive corrosion weight loss. Thus the beryllium content should be 0.001 to 0.2%, more preferably 0.005 to 0.05%. When containing more than 0.02% of beryllium, the slab can also be prevented from cracking.

For an increase in the capacitance of aluminum alloy foils, it is preferable to use an aluminum material at least 99.7% in purity. The capacitance increases with the increase in the purity of aluminum, so that it is more preferable to use aluminum with purity of at least 99.85%.

Aluminum alloy foils contain iron, silicon and other impurities which are inevitably incorporated thereinto during production. Especially when containing iron and silicon in a combined amount of more than 0.3%, the aluminum alloy foil will have a reduced capacitance. It is therefore desired that the combined amount of iron and silicon be up to 0.3%.

EXAMPLES 1–7

Slabs were cast from seven kinds of aluminum alloys having the compositions shown in Table 1 and checked for cracking. Subsequently two aluminum alloy foils were prepared from the slab of each kind in the usual manner. One foil of each alloy was tested for mechanical strength. The other foil was immersed in an aqueous solution of 3% hydrochloric acid and 0.5% oxalic acid at 60° C. and etched for 1.5 minutes with a.c. current at a current density of 30 A/dm$^2$. Without further conversion treatment, the foil was checked for capacitance.

COMPARISON EXAMPLES 1-4

Slabs were cast from the four kinds of aluminum alloys and checked for cracking. In the same manner as in the preceding examples, foils were prepared from the slabs and then tested for mechanical strength and capacitance.

Table 2 shows the results of Examples 1-7 and Comparison Examples 1-4.

TABLE 1

| Example | Purity of Al material (%) | Composition (%) | | | | | |
|---|---|---|---|---|---|---|---|
| | | Al | Cu | Ti | Si | Fe | Be |
| Ex. 1 | 99.85 | Bal. | 0.3 | 0.005 | 0.05 | 0.1 | 0.001> |
| 2 | 99.94 | " | 0.1 | 0.01 | 0.02 | 0.04 | " |
| 3 | 99.85 | " | 0.05 | 0.03 | 0.05 | 0.1 | " |
| 4 | 99.7 | " | 0.45 | 0.05 | 0.1 | 0.2 | " |
| 5 | 99.7 | " | 0.3 | 0.005 | 0.1 | 0.2 | " |
| 6 | 99.86 | " | 0.45 | 0.013 | 0.05 | 0.09 | 0.01 |
| 7 | 99.86 | " | 0.3 | 0.01 | 0.05 | 0.09 | 0.005 |
| Comp. Ex. 1 | — | " | 0.01> | 0.005 | 0.07 | 0.11 | 0.001> |
| 2 | 99.75 | " | 0.3 | 0.002> | 0.1 | 0.15 | " |
| 3 | 99.5 | " | 0.3 | 0.005 | 0.2 | 0.3 | " |
| 4 | 99.75 | " | 0.2 | 0.002> | 0.1 | 0.15 | 0.01 |

TABLE 2

| Example | Cracking | Capacitance (μF/cm$^2$) | Strength (kg/mm$^2$) |
|---|---|---|---|
| Ex. 1 | None | 245 | 29.8 |
| 2 | " | 190 | 30.1 |
| 3 | " | 185 | 30.5 |
| 4 | " | 230 | 30.8 |
| 5 | " | 235 | 30.2 |
| 6 | " | 263 | 30.5 |
| 7 | " | 270 | 30.3 |
| Comp. Ex. 1 | None | 170 | 20.0 |
| 2 | Cracked | 230 | 27.2 |
| 3 | None | 175 | 30.7 |
| 4 | Cracked | 260 | 30.3 |

Table 2 reveals that the aluminum alloy slabs prepared in Examples 1 to 7 are free of cracking and that the foils produced from the slabs have high capacitance and strength, whereas the aluminum alloys of Comparison Examples 1 to 4 are defective in the cracking resistance of the slab, or capacitance or strength of the foil prepared from the alloy.

We claim:

1. An aluminum alloy foil for use as a cathode foil in electrolytic capacitors prepared from an aluminum alloy consisting essentially of 0.3 to 0.5 percent of copper and 0.002 to 0.05 percent of titanium and containing iron and silicon as impurities in a combined amount of up to 0.3 percent, balance aluminum, in which the aluminum used as a material is at least 99.7 percent in purity.

2. An aluminum alloy foil as defined in claim 1, further consisting essentially of 0.001 to 0.2 percent of beryllium.

3. An aluminum alloy foil as defined in claim 2 wherein the beryllium content is 0.02 to 0.2 percent.

* * * * *